Nov. 10, 1953 E. E. MASTERSON 2,658,398

MAGNETIC SOUND-RECORDING AND REPRODUCING MACHINE

Filed June 29, 1948 3 Sheets-Sheet 1

INVENTOR
EARL E. MASTERSON
BY Morris A. Rabkin
ATTORNEY

INVENTOR
EARL E. MASTERSON
BY Morris A. Rahn
ATTORNEY

Nov. 10, 1953 E. E. MASTERSON 2,658,398

MAGNETIC SOUND-RECORDING AND REPRODUCING MACHINE

Filed June 29, 1948 3 Sheets-Sheet 3

INVENTOR
EARL E. MASTERSON
BY Morris A. Rabkin
ATTORNEY

Patented Nov. 10, 1953 2,658,398

UNITED STATES PATENT OFFICE 2,658,398

MAGNETIC SOUND-RECORDING AND REPRODUCING MACHINE

Earl E. Masterson, Palmyra, N. J., assignor to Radio Corporation of America, a corporation of Delaware Application June 29, 1948, Serial No. 35,892

1 Claim. (Cl. 74—190)

This invention relates to magnetic sound-recording and reproducing systems and has special reference to the provision of an improved constant tension power drive system for flexible magnetic-records.

The necessity of maintaining a reelable magnetic record under constant tension and speed during recording and reproducing intervals has long been known and many ingenious power drive systems have been proposed for that purpose. Such drive systems are exemplified (*a*) by the plural-motor system of Hutchison 1,718,355 (*b*) by the plural-clutch system of Camras 2,372,810 and (*c*) by the spring-biased reels of Scherbatskoy copending application Ser. No. 584,427, filed March 23, 1945, now Patent No. 2,477,146. Irrespective of the advantages claimed for the drives of each class, it may be said, generally, that those requiring duplicate parts are expensive and, furthermore, are objectionable when, in changing reels, the record must be wrapped in a tortuous path about several drums or pulleys. While spring-biased reeling systems are not necessarily subject to the foregoing disadvantages there is, nevertheless, a practical limit upon the size of spring tensioned reels, and hence in the length of the records which may be wound thereon.

Accordingly, the principal object of the present invention is to obviate the foregoing and other disadvantages of present day reeling systems and, more specifically, to provide a clutch-less, single motor, constant-tension drive system having the minimum number of guide rollers required to move a flexible web of any desired length from one reel to another.

A related broad object is to provide a simple, inexpensive and trouble-free method of winding a web of material from one reel to another, and one which in its practice operates to maintain the web under constant tension substantially irrespective of the speed of the web and its direction of travel.

Another and important object of the invention is to provide a power driven reeling system which shall lend itself to plural sound-track operation and to high-speed winding in either direction, and to proper control of the reels during starting and stopping at both "normal" and "high" speeds.

Another object is to provide a very compact, adjustable-speed, shaft-driven, flywheel-assembly wherein means are provided for compensating for minor eccentricities in the balance, and minor irregularities in the shaft propelled surface of the flywheel.

Yet another object of the present invention is to provide an improved magnetic sound recording and reproducing machine wherein it shall be substantially impossible for the operator accidentally or unwittingly to erase a previously made recording.

Figure 1:
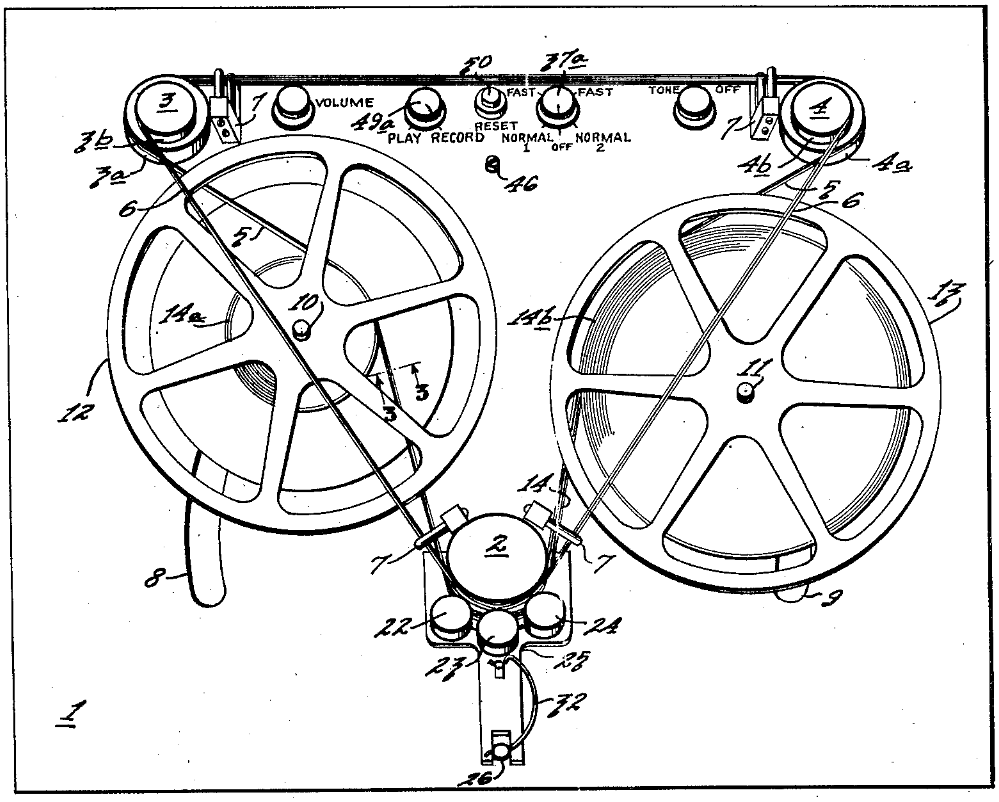
Figure 2:
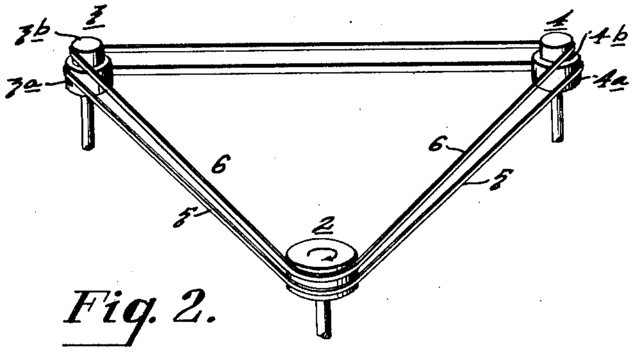
Figure 3:
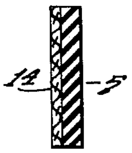
Figures 4, 5:
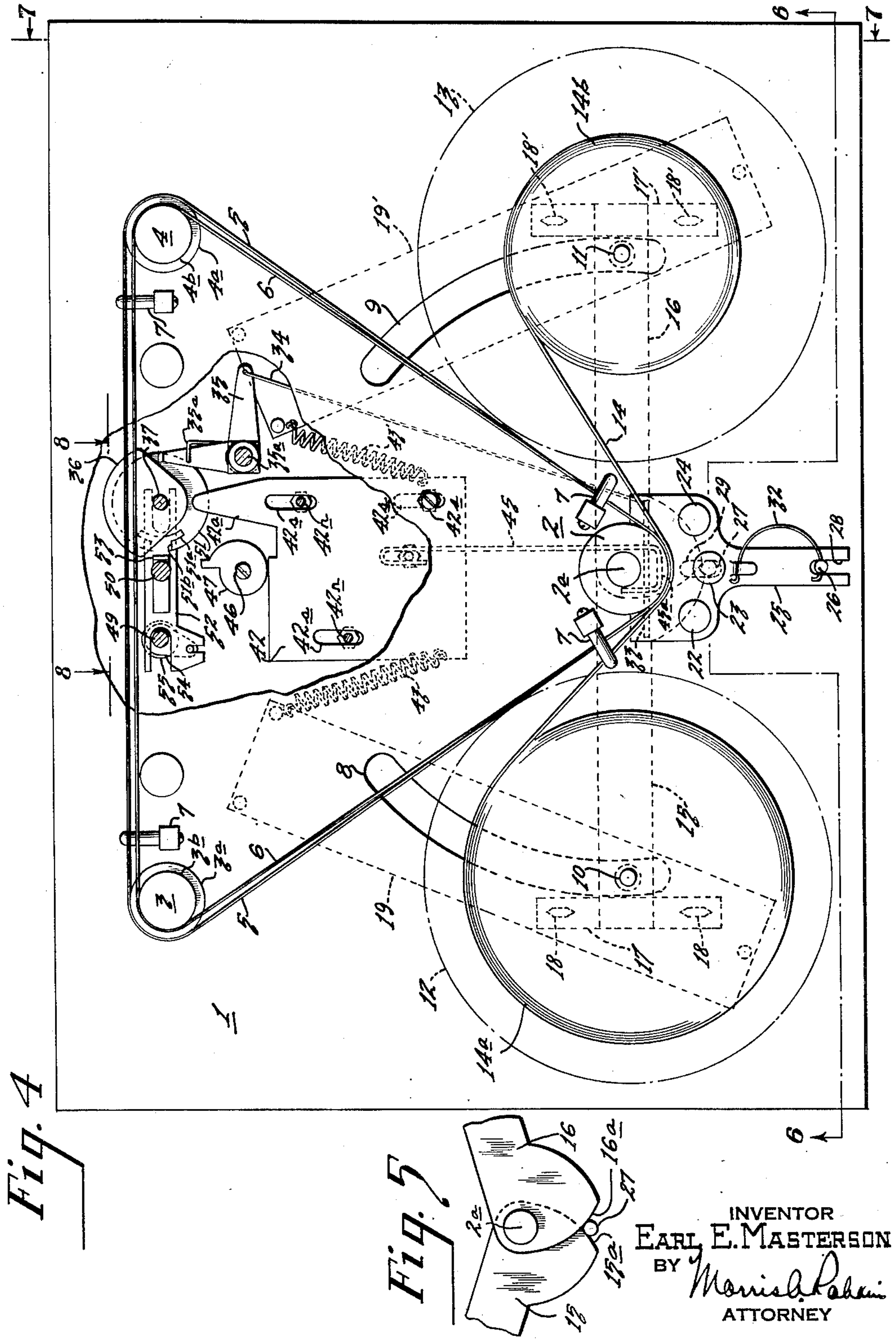
Figure 6:
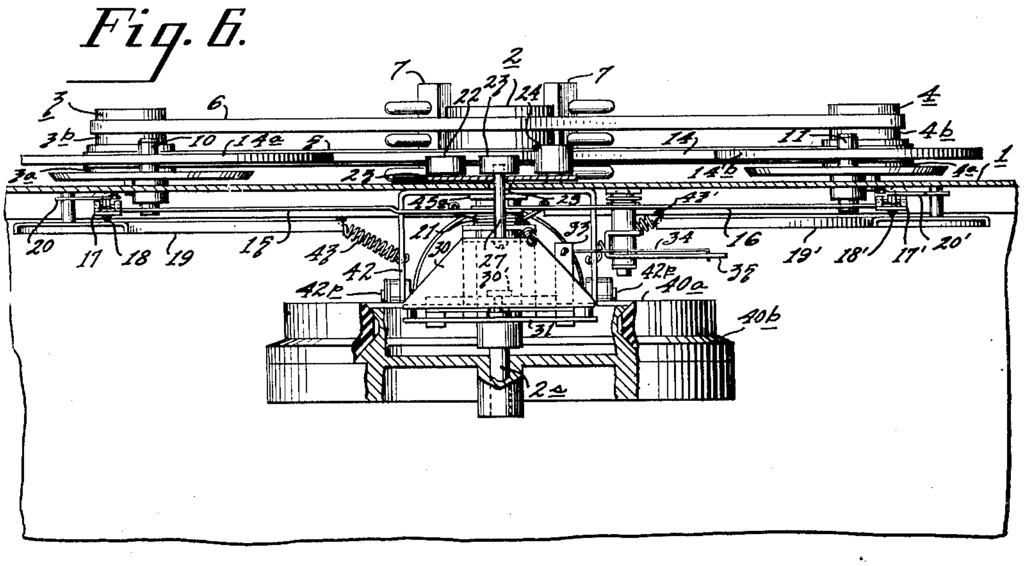
Figure 7:
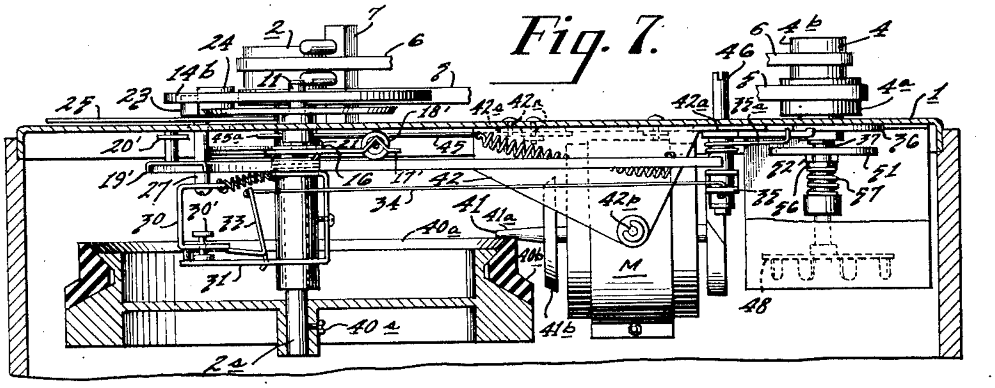
Figure 8:
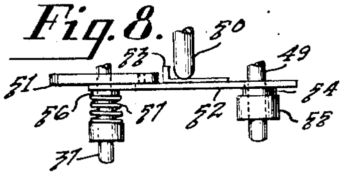
Figure 9:
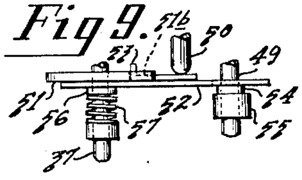
Figure 10:
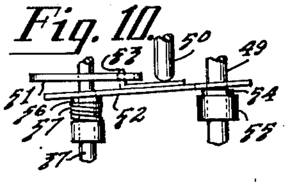

In the accompanying three sheets of drawings:

Fig. 1 is a view in perspective of a magnetic recording and reproducing machine incorporating the record reeling system and certain other novel features of the present invention, Fig. 2 is a view in perspective of the pulley system of Fig. 1, Fig. 3 is a cross-section taken on the line 3—3 of Fig. 1, showing the adjacent positions of the magnetic tape-record and the driving belt, Fig. 4 is a top plan view of the machine of Fig. 1, with the reels pulled back to facilitate the changing of a record, Fig. 5 is a fragmentary plan view of a cam mechanism employed in retracting the sound heads of the machine when the reels are pulled back, Fig. 6 is a front elevation, partly in section and Fig. 7 is a side elevation, partly in section, of the machine and, Figs. 8, 9 and 10 are sectional views taken on the line 8—8 of Fig. 4, showing the switch interlock mechanism in different operating positions.

In the drawings, wherein like reference characters designate the same parts in all figures, 1 designates a preferably horizontally disposed "motor board" or mounting panel through which the symmetrically disposed spindles of a triangular system of pulleys 2, 3 and 4 project. The pulley 2, at the apex of the (equilateral or isosceles) triangle defined by the axes of revolution of the said pulleys, is the driving pulley or "capstan" of the system and is arranged to be driven, in a manner later described, by a constant speed reversible electric motor M (see Fig. 7) disposed on the opposite side of the panel 1. The other two pulleys are idler "speed" pulleys of duplicate stepped construction; the "lower" steps **3*a* and 4*a* being of a diameter slightly less than that of the capstan 2 and the "upper" steps 3*b* and 4*b* being of a diameter less than the common diameter, of the said lower steps. By way of example; in one practical embodiment of the invention wherein the diameter of the capstan was one inch and three-quarters (1.75") and the spacing between the capstan 2 and the idler speed-pulleys 3 and 4 was of the order of ten inches (10") and the spacing between the said idler pulleys was about eleven and three quarters inches (11.75") the diameter of the lower steps 3*a* and 4*a*** of the speed pulleys was approximately one and one-quarter inches (1.25″) and the diameter of their upper steps 3b, 4b was approximately one inch.

A rubber or similar elastic band 5 is connected between the capstan 2 and the "lower" steps 3a and 4a of the idler speed-pulleys 3 and 4 and a flexible belt 6 (which is not necessarily "elastic") is connected between the capstan 2 and smaller "upper" steps 3b and 4b of the said idler pulleys. As shown in Figs. 1 and 6, the paths of both belts 5 and 6 may lead between the tines of a number of forked stationary guides 7 which limit undesired lateral and vertical movement of the said belts or bands.

It will be observed upon inspection of Figs. 1 and 4 that the mounting board or panel 1 is provided with a pair of arcuate slots 8 and 9 which lie on a circle whose center is the axis of the capstan 2 and whose ends intercept the midpoints on the sides 2—3, 2—4 respectively, of the triangle, beneath the lower elastic band 5. Each of the slots 8 and 9 accommodates a movable spindle, 10 and 11, respectively, of a reel 12, and 13, respectively, for a paper (or plastic) flexible magnetic record 14.

The reel spindles 10 and 11 are carried, respectively, on the outer ends of a pair of lever arms 15 and 16 whose fulcrum is the axis 2a of the capstan 2. The lower end of each spindle rests upon a carriage 17, 17′ respectively, having a pair of wheels 18, 18′ which ride on stationary plate-like tracks 19, 19′ suspended from the lower surface of the panel 1. A pair of spring latches 20, 20′ (Fig. 6), at the "lower" end of each of the tracks 19, 19′ operate to engage and to hold the periphery of the wheels 18, 18′ when the reels 12 and 13 are pulled forward (as shown in Fig. 4) for the purpose of replacing a record.

The lever arms 15 and 16, and hence the spindles 10 and 11 and the reels 12 and 13 thereon, are normally biased in the direction of the elastic belt 5 as by means of a coil spring 21 (Fig. 6) which is wrapped about the axis of the capstan 2 and has its opposite ends connected, respectively, to the said lever arms. Thus, the rolled portions 14a—14b of the tape 14 on each reel are normally urged into frictional power-take-off relation with respect to the lower, elastic band 5. The path of the tape 14 between the reels 12 and 13 lies contiguous to the path of the elastic band 5 (see Fig. 3) around the capstan 2 and extends from the capstan along the arcuate lines whereat the said band touches the outer layer of tape on each reel. In its journey between the reels the tape runs across the pole pieces of a number (in this case, three) of magnetic applicators, 22, 23 and 24 which are arranged about the periphery of the capstan 2 on the outside of the triangle defined by the pulley system.

The described triangular arrangement of the pulleys 2, 3 and 4, and of the belts 5 and 6 is entirely symmetrical. Hence the drive system of the present invention lends itself readily to so-called "double-track" operation, in which one sound track is recorded while the tape is running in one direction and a second sound track is recorded in the opposite direction. As will hereinafter more fully appear the arrangement and operation of the magnetic applicators 22, 23 and 24 is such that the one (23) in the center serves as the erasing head for both the "upper" and "lower" sound tracks, and the other two serve, respectively, as both recording and reproducing heads for individual ones of said sound tracks. In this latter connection it will be observed (see Fig. 6) that the head 24 for the "upper" sound track extends across the tape, while the head 22 extends only across that portion of the tape which contains the lower sound track.

In handling tape, a slight holdback action is required on the feeding reel to prevent the building up of loop and a slight overdrive is necessary on the take-up reel to assure that all the tape will be wound up to the desired degree of tightness. The manner in which the drive system of the present invention operates to provide the required holdback and overdrive for the reels will be the more readily apparent upon consideration of the following analysis of the basic system, shown in Fig. 2. Here if the capstan pulley 2 is driven in the indicated (clockwise) direction, and the speed pulleys 3 and 4 are free to rotate, it will be seen that certain sections of the lower (rubber) band or belt 5 will be stretched, while other sections will be relaxed. The upper belt 6, which is not necessarily elastic, will have a tendency to drive the pulleys 3 and 4 at a higher speed than if only the lower belt were driving. Since the belts 5 and 6 pass around the different steps 3a, 4a, 3b, 4b, of the speed pulleys 3 and 4 at the same time, the elastic belt 5 will be stretched during its journey between 2 and 3 and relaxed in its journey between 4 and 2. This stretching and relaxing is exactly what is needed to provide the overdrive and holdback action on the reels. Under these conditions, when the rubber belt 5 is being stretched, its linear velocity is increased. This increase in linear velocity of the belt 5 must be accounted for somewhere, and this takes place when the said belt is between 4 and 2. Where relaxed, the linear velocity of the belt 5 is lower than normal. Referring now to Fig. 1: If the direction of travel of the tape 14 is from the right reel 13 to the left reel 12 it can be seen that the stretching action of the lower (elastic) belt 5 between the capstan 2 and the speed pulley 3 will provide the necessary overdrive to wind the tape on the "take-up" reel 12. The relaxing of the said belt 5 between 4 and 2 provides the holdback action on the other or "feeding" reel 13. When the direction of movement of the capstan 2 is reversed either for the purpose of playing the other sound track or for re-reeling the record, the belt 5 stretches in running between the pulley 4 and the capstan 2 and relaxes in its journey between the capstan 2 and the pulley 3. Thus, the drive system operates to maintain the tape under constant tension irrespective of the direction and speed in which it is driven between reels.

*The "Sound Heads"*

As previously mentioned, where, as in the instant case, three magnetic applicators are employed for double sound track operation the central applicator 23 may comprise the "erasing head" for both the "upper" and the "lower" tracks and, as will hereinafter more fully appear, must be capable of being shifted upwardly and downwardly from one track to the other. The other magnetic applicators 22 and 24 each serve but a single sound-track and hence need not be mounted to permit of vertical movement. However, it is desirable that all three heads be mounted in such a way as to permit them to be moved away from the capstan 2 when (a) the reels are pulled back to facilitate the removal and replacement of the tape and (b) during the fast rewinding movement and during the fast forward movement of the tape, so that playing or recording or erasing cannot occur when the reels are in their normal position and the tape is subjected to either of said fast-forward or fast re-winding movements. The manner in which all three of the magnetic applicators are moved, simultaneously, away from the capstan 2 when the reels are pulled back will first be described.

It will be observed upon inspection of Figs. 1 and 4 that there is a Y-shape plate 25 in front of the capstan 2 and that this plate is supported on the panel 1 for slidable movement toward and away from the capstan, by means of two pins 26 and 27 which extend through elongated slots 28 and 29, respectively, on the central "vertical" axis of the Y. The playing and recording heads 22 and 24 for the upper and lower sound tracks on the tape 14 are secured to this horizontally slidable plate 25 on opposite sides of the upper pin 27. The erasing head 23 is fixed on the upper end of this pin 27. The shank of the pin 27 extends through a suitably elongated slot in the panel 1 beneath the slot 29 and, as shown in Fig. 7, is affixed at its lower end to a support 30 which is mounted to permit of both horizontal and vertical (up and down) movements on a platform 31. As shown more clearly in Fig. 5, the lever arms 15 and 16 (upon which the spindles 10 and 11 of the reels are mounted) are pivoted about the axis 2*a* of the capstan 2 and terminate in scissor-like cam surfaces 15*a*, 16*a* whose "blades" lie on opposite sides of the pin 27 upon which the erasing head 23 is fixed. Hence, when the reels are pulled back, as shown in Fig. 4, the scissor-like cam surfaces 15*a*—16*a* close and push the pin 27 and hence the erasing head 23 away from the capstan. In moving away from the capstan the pin 27 encounters the end of the slot 29 in the slidable Y-shape plate 25 upon which the recording-reproducing heads 22 and 24 are mounted and pushes the said plate and the said sound heads in the same direction, away from the capstan, so that there is ample room between the capstan 2 and the three sound heads 22, 23 and 24 to permit the tape 14 to be placed therebetween. When the reels are pushed back to their normal position the sound heads 22 and 24 return to their normal position, in contact with the tape on the capstan, by the force applied to the slidable plate 25 by a bowed biasing spring 32. Another spring 27*s* (see Fig. 7) operates to return the pin 27, and hence the erasing head 23 thereon, to its normal position in contact with the tape on the capstan.

As above indicated, the normal (playing and recording) position of each of the magnetic applicators 22, 23 and 24 is in actual physical contact with the tape. Thus, in order to establish and to maintain this relation it is important that the three applicators or sound heads be "self-centering." This is achieved in the case of the playing-recording heads 22 and 24 by making the pin 27 of a diameter appreciably smaller than that of the slot 29 in which it is received, so that the Y-shape plate 25 upon which the said heads are mounted may pivot at least slightly about the other pin 26. The erasing head 23, on the other hand, is made "self-centering" by mounting the support 30 for the pin 27 with a loose fit upon a stud 30*a* so that the assembly 30, 27 upon which the head 23 is mounted may "shift" or "give" in any direction required to establish perfect contact between the head 23 and the tape.

The vertical movement of the pin 27, and its support 30, which is required to shift the erasing head 23 from the "lower" to the "upper" sound-track on the tape 14 is provided by a lever 33 (Fig. 7). One arm of this lever extends over the surface of the platform 31 to a point beneath the support 30 and the other or vertical arm has a stiff actuating rod 34 connected thereto. As shown more clearly in Fig. 4, this rod 34 is connected at its other end to a lever 35 which is biased by a spring 35*s* into engagement with a cam 36 on a switch-control shaft 37 at the rear of the panel 1. When the knob 37*a* on the shaft 37 is turned to position "Normal 2" (Fig. 1) the cam 36 causes the lever 35 to pivot on its fulcrum 35*a* and to pull back the actuating rod 34 and the vertical arm of the lever 33 to which the said rod is connected. This causes the free end of the horizontal arm of the said lever, 33, to tilt upwardly and lifts the pin 27 to a position whereat the erasing head 23 is adjacent to the portion of the magnetic tape 14 that is allotted to the "upper" sound track.

*The motor drive*

As shown more clearly in Fig. 7 the rotatable shaft 2*s* upon which the driving pulley or capstan 2 is mounted has a rubber-tired flywheel 40 secured to its lower end as by means of a set screw 40*s*. It will be observed that this flywheel has a substantially flat upper surface 40*a* and is provided with a downwardly inclined peripheral flange or shoulder 40*b*. The flywheel 40 (and hence the capstan 2 thereon) is driven in either direction at its "normal" speed (of, say 78.2 R. P. M.) by the force applied to its flat upper surface 40*a* through the conical end-portion 41*a* of the shaft 41 on the motor M, and may be driven in either direction at a "high" speed (of say 500–600 R. P. M.) by moving the motor M forwardly and tilting it to bring a beveled wheel 41*b* of larger diameter into driving engagement with the downwardly inclined flange 40*b* on the periphery of the flywheel.

It has been found that minor inaccuracies in the flat upper surface 40*a* of the flywheel and minor eccentricities in its rotation are of no moment when, (*a*) the axis of the driving shaft 41 is in register with a point on the (vertical) common axis 2*a* of the capstan 2 and flywheel 40, and (*b*) the taper of the conical end portion 41*a* of the said shaft is uniform as measured along the shaft axis with respect to said point. It may be pointed out that this "compensation" is not achieved in a conventional "rim drive" wherein the axis of the driving shaft is parallel to the axis of the driven shaft.

The forward movement and the tilt of the motor M required to bring the beveled wheel 41*b* on the shaft 41 into register with the complementary beveled rim 40*b* on the flywheel 40 is made possible by mounting the motor on pivots 42*p* (Fig. 7) upon an inverted U-shape carriage 42 on the underside of the motor board or panel 1. As shown in Fig. 4 the base of this U-shape carriage 42 is provided with a number (in this case, three) of elongated slots 42*s* and is mounted for movement toward and away from the capstan 2 by supporting studs 42*r* which extend through the said slots. Two coil springs 43, 43′ each secured at one end to one side of the slidable motor carriage 42 and anchored at their other ends to the immovable plates 19, 19′ normally bias the motor to a position whereat the small outer end of the conical portion 41*a* of the motor shaft 41 is in contact with the flat upper surface 40*a* of the flywheel 40. The motor-carriage 42 may be moved forward, against the force of its biasing springs 43, to bring the shaft wheel 41b into high-speed driving relation with respect to the flywheel 40, by turning the knob 37a on the control shaft 37 to either of its "Fast" positions. As shown in Fig. 4 the coupling between the control shaft 37 and the motor-carriage 42 comprises the cam 36 which is urged into engagement with a stationary arm 42a on the said carriage when the knob 37a is turned.

Referring still to Fig. 4, it will be observed that there is a stiff wire or rod-like element 45 which is secured at one end to the motor carriage 42 and terminates at its opposite end in an open loop 45a which partly surrounds the shaft 2s upon which the capstan 2 is mounted. The leading end of this loop 45a thus extends across the path of movement of the pin 27 upon which the erasing head 23 is mounted. Hence, when the knob 37a is turned to either of its "Fast" positions (as is required to move the carriage 42 forward) the said loop 45a is brought into contact with the pin 27 and moves the erasing head 23 and the Y-shape plate 25, upon which the sound heads 22 and 24 are mounted, away from the path of the magnetic tape 14 so that no magnetic-coupling exists between the tape and any of the sound heads during the fast forward or rewind movements of the tape.

Reference has heretofore been made to the fact that the free-end portion 41a of the shaft 41 of the movably mounted reversible motor M is of conical shape. This permits minor adjustments in the speed of the flywheel 40 (and hence of the capstan and tape 14) such as may be required to synchronize the sound on the tape with a motion-picture film, not shown. This adjustment may be made from the top of the panel 1 by turning a knob or kerf on the end of a shaft 46 which carries a cam 47 (Fig. 4) on its lower end. This cam 47 is positioned at the rear of the carriage 42 on which the motor is mounted and serves as an adjustable backstop therefor. Thus, when the shaft 46 is turned, the eccentric portion of the cam is caused to bear against the rear end of the carriage 42 and to urge it forwardly, against the force of the biasing springs 43, the small distance required to move the conical portion 41a of the motor shaft inwardly with respect to the axis of the flywheel 40. Here, obviously, the exact speed of the flywheel, and hence of the tape, will depend upon the diameter of the particular part of the cone 41a which is in contact with the flywheel.

*The controls and the interlock therefor*

It will be observed upon inspection of Fig. 1 that there is an array of four control knobs and a centrally disposed "Reset" button or plunger 50 on the panel 1. It would needlessly burden this specification to describe the function of the separate "Volume" and "Tone-Off" controls except to say that they may be operated to control a conventional amplifier (not shown) of a conventional sound system.

The knob 37a which, as previously described, controls the speed of rotation of the capstan 2 (by moving the motor-carriage 42, and hence the position and driving ratio of the motor shaft 41) also controls the actuation of an electrical switch 48 (Fig. 7) containing contacts (not shown) which operate to control the energization and the direction of rotation of the reversible motor M. Thus, when the said knob 37a is turned to the left to its "Normal 1" position, the switch arm is turned to the contact required to drive the motor in a direction to wind the tape off the reel 12 onto the reel 13 and, when turned to the right to the "Normal 2" position, a contact is energized which reverses the direction of rotation of the motor and hence drives the capstan 2 in the direction required to wind the tape 14 off of the reel 13 onto the reel 12. A similar switch (not shown) under the control of the shaft 49 to which the knob 49a is attached will be understood to control the energization of the particular ones of the magnetic applicators 22, 23, 24 required to "Play," or to "Record" upon, either one of the two sound-tracks on the tape 14.

As will hereinafter more fully appear in connection with the description of Figs. 8, 9, 10 and 4, the control shafts 37 and 49 are connected by an interlock which operates under the control of the "Reset" plunger 50 to (*a*) prevent the motor from being turned on in the event that the knob 49a inadvertently has been left in its "Record" position, (*b*) to prevent the switch knob 49a from being turned, inadvertently, to its "Record" position when the motor is running and (*c*) to prevent the knob 37a from being turned to either of its "Fast" positions when the knob 49a is in its "Record" position. It is thus impossible, inadvertently, to erase a previous recording or to make a recording whilst the tape is being rewound rapidly upon either reel.

The interlock mechanism for the control shafts 37 and 49 consists of (*a*) a circular cam 51 fixed on the shaft 37, (*b*) a latch bar 52 which extends between the said shafts 37 and 49, (*c*) an L-shape latch 53 fixed on the upper surface of the bar 52, (*d*) an arm 54 (see Fig. 4) fixed on the shaft 49 for moving the latch bar 52 in a horizontal plane, and (*e*) the plunger 50 which operates to tilt the said bar.

As shown more clearly in Fig. 4 the circular cam 51 on the shaft 37 has an arcuate slot 51a therein which communicates with the periphery of the said cam through a radially extending throat 51b. The cam 51 is so fixed on the shaft 37 that its throat 51b is in line with the L-shape latch 53 only when the said shaft 37 is in its "Off" position and the arcuate slot 51a in the said cam is dimensioned to receive the upstanding arm of the L-shape latch 53 when it is entered therein through the throat 51b of the slot. As shown in Figs. 8, 9 and 10 the latch bar 52 rests at one end upon the top surface of the arm 54 which, in turn, rests upon a collar 55 which is fixed on the shaft 49 and, at its opposite end, upon a vertically movable collar 56 on the shaft 37. As shown in Figs. 8 and 9, the latch bar 52 is normally biased to its horizontal position by a coil spring 57 which is wrapped about the shaft 37 beneath the collar 56, but may be tilted downwardly against the force of said spring when the "Reset" plunger 50 is held down as shown in Fig. 10.

*Operation of the interlock*

When the knob 37a on the shaft 37 is in its "Off" position and the knob 49a on the shaft 49 is in its "Play" position the interlock is in the condition shown in Fig. 8; that is to say, the L-shape latch 53 is out of engagement with the cam 51. Hence the motor may be turned on by turning the knob 37a to its "Normal 1," or to its "Normal 2" position (as determined by the particular sound track the operator elects to "play") or, the said knob may be turned (in either direction) past the said "Normal" speed positions to either of the "Fast" speed positions to wind or to re-wind the tape upon a particular reel. (As previously described, when the knob 37a is turned to a "Fast" position the sound heads 22, 23 and 24 are moved, automatically, away from the capstan 2 to break the magnetic coupling between the tape and the soundheads).

In the event that the operator wishes to erase a previous recording upon the tape and to make a new recording thereon he must first turn-off the motor, by turning the knob 37a to "Off," since, if an effort is made to turn the knob 49a to its "Record" position while the motor is running, the latch 53 would be urged against the uncut peripheral portion of the cam 51 and prevent the latch bar 52, and hence the arm 54 and the shaft 49, from turning. When the motor is turned "Off" the throat 51b of the slot in the cam 51 is in register with the L-shape latch 53, hence the knob 49a on shaft 49 may be turned to its "Record" position. However, merely turning shaft 49 to "Record" does not allow the motor shaft 37 to be turned "on" since, as shown in Fig. 9, the horizontal arm of the L-shape latch is now in the throat 51b of the cam 51 on the shaft 37 and hence prevents the said shaft 37 from turning. However, when the "Reset" plunger 59 is pushed down, as shown in Fig. 10, the horizontal arm of the L-shape latch 53 is moved downwardly out of the throat 51b of the cam 51, hence the shaft 37 which controls the operation of the motor may be turned to either of its "Normal" positions but is prevented from being turned through a larger arc to either of its "Fast" positions by the upstanding arm of the L which remains within the arcuate slot 51a. Thus, a deliberate two-handed operation is required before a previously-made recording can be erased and, in no event, can a recording either be made or played whilst the record is being run at other than its normal speed.

From the foregoing it will be apparent that the present invention provides an improved two-direction, two speed, self-compensating, fool-proof, reeling system for magnetic sound-recording and reproducing machines.

What is claimed is:

In a reeling system for a reelable magnetic record, a capstan for applying a reeling force to said record, a rotatable shaft upon which said capstan is mounted, a flywheel fixed on said shaft, said flywheel having a substantially flat surface portion adjacent to its periphery and an edge portion normal to the axis of said shaft and inclined with respect to said axis, said inclined edge portion constituting a shoulder on said flywheel, a driving shaft having an axis of rotation and mounted for movement in an axial direction, said axis of said driving shaft being normal to the axis of rotation of said first mentioned shaft, said driving shaft having a conical end-portion through which a driving force may be applied to said flat surface portion of said flywheel and an inner wheel-portion of larger diameter through which a driving force may be applied to said shoulder of said flywheel, said shoulder extending radially from the outer peripheral face of said flywheel, adjustable biasing means effectively connected to said driving shaft for maintaining a selected area of said conical end portion of said shaft in frictional driving relation with respect to said flat surface portion of said flywheel whereby to drive said capstan and hence said reelable record at a selected "low" speed, and means for moving said driving shaft against the force of said adjustable biasing means to bring said wheel-portion of said driving shaft into frictional driving relation with respect to said shoulder of said flywheel, whereby to drive said capstan and hence said reelable record at a predetermined "high" speed.

EARL E. MASTERSON.

References Cited in the file of this patent

UNITED STATES PATENTS

| Number | Name | Date |
|---|---|---|
| 1,495,993 | Farmer | June 3, 1924 |
| 1,556,688 | Hillix | Oct. 13, 1925 |
| 1,632,781 | Bangser | June 21, 1927 |
| 1,808,551 | Heisler | June 2, 1931 |
| 1,827,588 | Kellogg | Oct. 13, 1931 |
| 2,096,231 | Ensign et al. | Oct. 19, 1937 |
| 2,118,347 | Hardenberg | May 24, 1938 |
| 2,222,462 | Kaddeland | Nov. 19, 1940 |
| 2,398,879 | Bouget | Apr. 23, 1946 |
| 2,419,476 | Begun | Apr. 22, 1947 |
| 2,422,143 | Somers et al. | June 10, 1947 |